US009663838B2

(12) United States Patent
Yoshino et al.

(10) Patent No.: US 9,663,838 B2
(45) Date of Patent: May 30, 2017

(54) METAL RECOVERY METHOD

(71) Applicant: NISSHIN STEEL CO., LTD., Chiyoda-ku, Tokyo (JP)

(72) Inventors: Takahiro Yoshino, Yamaguchi (JP); Masayuki Sugiura, Yamaguchi (JP); Masakazu Mori, Yamaguchi (JP); Shintarou Tada, Yamaguchi (JP)

(73) Assignee: Nisshin Steel Co., Ltd., Tokyo (JP)

( * ) Notice: Subject to any disclaimer, the term of this patent is extended or adjusted under 35 U.S.C. 154(b) by 78 days.

(21) Appl. No.: 14/429,556

(22) PCT Filed: Jul. 25, 2013

(86) PCT No.: PCT/JP2013/070163
§ 371 (c)(1),
(2) Date: Mar. 19, 2015

(87) PCT Pub. No.: WO2014/045710
PCT Pub. Date: Mar. 27, 2014

(65) Prior Publication Data
US 2015/0247213 A1    Sep. 3, 2015

(30) Foreign Application Priority Data

Sep. 21, 2012  (JP) .................................. 2012-207721

(51) Int. Cl.
*B22D 43/00*    (2006.01)
*B22D 41/00*    (2006.01)
(Continued)

(52) U.S. Cl.
CPC ............ *C21C 7/0075* (2013.01); *B22D 41/00* (2013.01); *B22D 41/001* (2013.01); *B22D 43/00* (2013.01);
(Continued)

(58) Field of Classification Search
CPC ... C21C 7/0075; C21C 5/5294; B22D 41/001; B22D 43/00; F27D 25/00; F27D 25/001
See application file for complete search history.

(56) References Cited

U.S. PATENT DOCUMENTS 2,564,037 A  *  8/1951  Slottman .............. B22D 41/001
                                                    134/102.1
3,153,602 A     10/1964  Richard
(Continued)

FOREIGN PATENT DOCUMENTS

JP     8-193210 A     7/1996
JP     9-314316 A    12/1997
(Continued)

OTHER PUBLICATIONS

Sugimura et al., Abstract of WO 2012121078 A1 published Sep. 13, 2012 patent family including US 20130333521 A1. Derwent ACC No. 2012-L95572.*

(Continued)

*Primary Examiner* — George Wyszomierski
*Assistant Examiner* — Tima M McGuthry Banks
(74) *Attorney, Agent, or Firm* — Rothwell, Figg, Ernst & Manbeck, P.C.

(57) ABSTRACT

After molten metal has been poured from a ladle 6 into a converter, metal 6b adhering to the ladle 6 is dropped into the ladle 6 on-line, and molten metal is poured from an electric furnace into the ladle 6 into which the metal 6b has been dropped. As a result, the metal 6b is melted and is recovered as a material.

6 Claims, 4 Drawing Sheets

(51) Int. Cl.
*C21C 7/00* (2006.01)
*C22C 38/18* (2006.01)
*F27D 25/00* (2010.01)
*C21C 5/00* (2006.01)
C21C 1/06 (2006.01)
C21C 5/52 (2006.01)

(52) U.S. Cl.
CPC .............. *C21C 5/005* (2013.01); *C22C 38/18* (2013.01); *F27D 25/00* (2013.01); *F27D 25/001* (2013.01); *C21C 1/06* (2013.01); *C21C 5/5294* (2013.01); *C21C 2200/00* (2013.01); *Y02P 10/216* (2015.11)

(56) References Cited

U.S. PATENT DOCUMENTS 4,560,405 A * 12/1985 Miyawaki ............. C21C 7/0075
75/10.45

8,057,570 B2 * 11/2011 Hayman ............. C21B 13/0006
75/10.6
2013/0333521 A1 * 12/2013 Tada ........................ C21C 1/02
75/375

FOREIGN PATENT DOCUMENTS

| | | | |
|---|---|---|---|
| JP | 2001-179437 A | 7/2001 |
| JP | 2003-001414 A | 1/2003 |
| JP | 2003-166010 A | 6/2003 |
| JP | 2011-208207 A | 10/2011 |
| WO | 2006039744 A2 | 4/2006 |
| WO | 2011121856 A1 | 10/2011 |

OTHER PUBLICATIONS

Communiation cited in European Application No. 13838170.2 dated Apr. 25, 2016, 7 pages.
International Search Report issued in International Application No. PCT/JP2013/070163 on Oct. 29, 2013, 2 pages.

* cited by examiner (ELECTRIC FURNACE TAPPING PROCESS)

(KR DESULFURIZATION PROCESS)

(CONVERTER POURING PROCESS)

(INJECTION STIR REFINING)

METAL RECOVERY METHOD

CROSS REFERENCE TO RELATED APPLICATIONS

This application is a 35 U.S.C. §371 National Phase Entry Application from PCT/JP2013/070163, filed Jul. 25, 2013, and designating the United States, which claims priority under 35 U.S.C. §119 to Japanese Patent Application No. 2012-207721 filed Sep. 21, 2012, which is incorporated herein by reference in its entirety.

TECHNICAL FIELD

The present invention relates to a metal recovery method for recovering, as a material, metal that adheres to a ladle.

BACKGROUND ART

Generally, a large amount of metal adheres to a ladle when the ladle is used over a plurality of charges, and it becomes accordingly necessary to remove the metal from the ladle. Patent literature 1 proposes a feature of transporting a ladle, in a state where no molten metal is held therein, to a ladle maintenance plant (off-line), where the metal adhering to the ladle is made to fall by using heavy machinery, and is removed from the ladle. In the ladle maintenance plant, the ladle is serviced in terms of, for instance, re-lining of refractory material, and spraying of monolithic refractory material. A ladle that has been transported to the ladle maintenance plant becomes a stand by ladle (resting ladle) until another ladle is transported to the ladle maintenance plant. The metal removed from the ladle is charged into a melting furnace, and as a result, the metal is melted and recovered as a material.

Patent literature 1: Japanese Patent Application Publication No. H08-193210

DISCLOSURE OF THE INVENTION

In ironworks and steel mills, the molten metal in the ladle may in some instances be subjected to stir refining. Stir refining involves substantial flow of molten metal, and accordingly an even greater amount of metal adheres to the ladle. That is, metal may in some instances adhere in amounts that interfere with the operation of the ladle, even if the remaining life of the refractory material in the ladle is sufficient. In the method of Patent literature 1, metal removal is performed in the ladle maintenance plant, serving also the purpose of ladle maintenance. When the method of Patent literature 1 is applied directly in an instance where stir refining is carried out, the ladle is repeatedly transported unnecessarily, which detracts from operational efficiency. In a method that involves metal removal in the ladle maintenance plant, moreover, heat from the ladle and the metal cannot be utilized effectively in operations.

It is an object of the present invention, arrived at in order to solve the above problems, to provide a metal recovery method that allows avoiding deterioration of operational efficiency in a case where stir refining is carried out, and that allows utilizing the heat of a ladle and of metal more effectively.

The metal recovery method according to the present invention is a metal recovery method for recovering, as a material, metal that adheres to a ladle in a series of processes in which molten metal is poured from a melting furnace into the ladle, the molten metal is subjected to stir refining inside the ladle, and the molten metal inside the ladle is poured into a refining furnace, the method comprising the step of, after pouring of the molten metal from the ladle into the refining furnace, having the metal adhering to the ladle fall into the ladle on-line, and pouring the molten metal from the melting furnace into the ladle into which the metal has fallen, to melt the metal and recover the metal as a material.

In the metal recovery method of the present invention, after pouring of molten metal from a ladle into a refining furnace, metal adhering to the ladle is made to fall into the ladle on-line, and the molten metal is poured from a melting furnace into the ladle into which the metal has fallen; as a result, the metal is melted and recovered as a material. This allows, in consequence, avoiding deterioration of operational efficiency in a case where stir refining is carried out, and allows utilizing the heat of a ladle and of metal more effectively.

BEST MODE FOR CARRYING OUT THE INVENTION

Modes for carrying out the present invention will be explained next with reference to the accompanying drawings.

Embodiment 1

Figure 1:
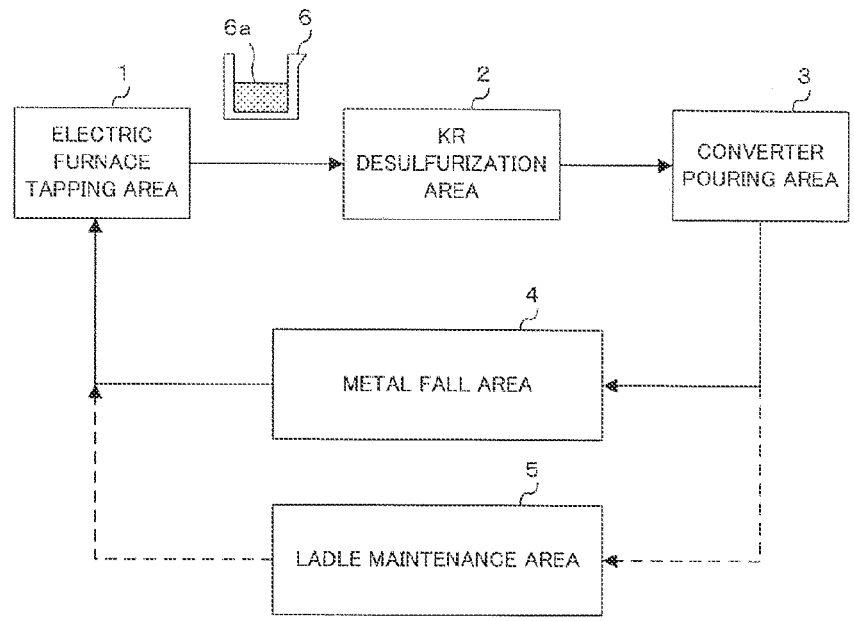
FIG. 1 is an explanatory diagram illustrating a steel mill to which a metal recovery method according to Embodiment 1 of the present invention is applied.

FIG. 1 is an explanatory diagram illustrating a steel mill to which the metal recovery method according to Embodiment 1 of the present invention is applied. In the figure, the steel mill is provided with an electric furnace tapping area 1, a KR desulfurization area 2, a converter pouring area 3, a metal fall area 4 and a ladle maintenance area 5. A ladle 6 that transfers molten metal 6*a* within the steel mill is ordinarily transported in the order electric furnace tapping area 1, KR desulfurization area 2, converter pouring area 3 and metal fall area 4. The ladle 6 that is transported up to the metal fall area 4 is returned to the electric furnace tapping area 1. Although FIG. 1 illustrates one ladle 6, a plurality of ladles 6 may also be made to circulate in the order electric furnace tapping area 1, KR desulfurization area 2, converter pouring area 3 and metal fall area 4.

The ladle 6 is transported to the ladle maintenance area 5 (off-line) when maintenance, for instance the exchange of refractory material, is required. A ladle 6 that has been transported to the ladle maintenance area 5 becomes a stand by ladle (resting ladle) until another ladle 6 is transported to the ladle maintenance area 5.

Figure 2:
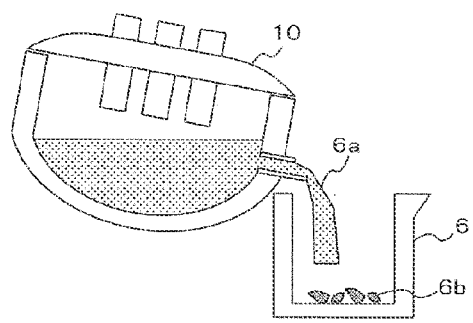
FIG. 2 is an explanatory diagram illustrating an electric furnace tapping process that is performed in an electric furnace tapping area of FIG. 1.

Next, FIG. 2 is an explanatory diagram illustrating an electric furnace tapping process that is performed in the electric furnace tapping area 1 of FIG. 1. In the figure, the electric furnace 10 is a melting furnace in which molten metal 6a is generated through melting of a material. In the electric furnace tapping area 1, the molten metal 6a that is generated in the electric furnace 10 is poured into the ladle 6. The molten metal 6a in the present embodiment is stainless-steel molten metal comprising 9 to 30 mass % of Cr and 1 to 4 mass % of C.

Metal 6b has been already been fallen, into the ladle 6, by the time the molten metal 6a is poured into the ladle 6 from the electric furnace 10. As described in detail further on (see FIG. 5), the metal 6b is fallen into the ladle 6 as a result of a metal drop process that is performed in the metal fall area 4 (see FIG. 1). As a result of pouring of the molten metal 6a from the electric furnace 10 into the ladle 6 into which the metal 6b has been dropped, the metal 6b is melted and is recovered as a material.

Figure 3:
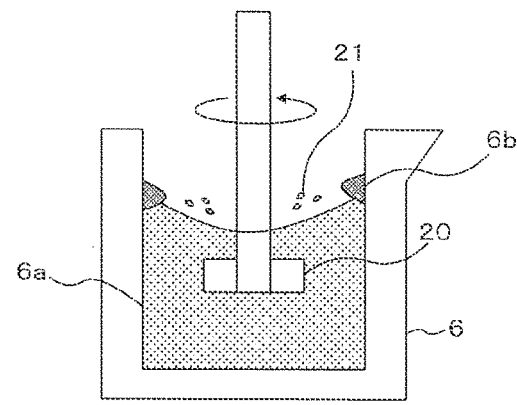
FIG. 3 is an explanatory diagram illustrating a KR desulfurization process that is performed in a KR desulfurization area of FIG. 1.

Next, FIG. 3 is an explanatory diagram illustrating a KR desulfurization process that is performed in the KR desulfurization area 2 of FIG. 1. In the figure, KR desulfurization is performed in the KR desulfurization area 2. Herein, KR desulfurization denotes mechanical stir refining (in-ladle refining) in which a desulfurizing agent such as quicklime, soda ash, carbide, caustic soda, slaked lime or the like is supplied into the ladle 6 in which the molten metal 6a is held, followed by agitation by an impeller 20 that is immersed in the molten metal 6a. The desulfurization reaction in the molten metal 6a is promoted, and the sulfur concentration in the molten metal 6a is accordingly reduced, through agitation by the impeller 20.

The liquid level of the molten metal 6a on the inner wall side in the ladle 6 rises during agitation by the impeller 20. Accordingly, the molten metal 6a comes in contact with the upper inner wall of the ladle 6, which is not touched by the molten metal 6a in the absence of agitation, and that is at a low temperature. The molten metal 6a that comes in contact with the upper inner wall is cooled by the upper inner wall, and adheres to the upper inner wall in the form of metal 6b. Further, splash 21 is generated through rotation of the impeller 20 during agitation by the impeller 20. This splash 21 also becomes cooled at the upper inner wall, and adheres to the upper inner wall in the form of metal 6b.

Figure 4:
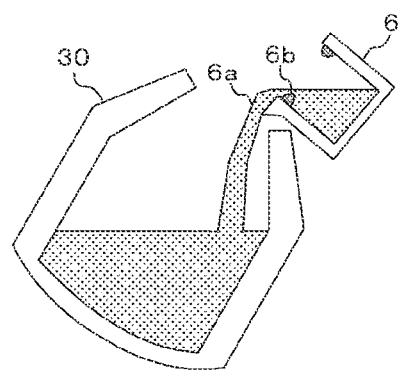
FIG. 4 is an explanatory diagram illustrating a converter pouring process that is performed in a converter pouring area of FIG. 1.

Next, FIG. 4 is an explanatory diagram illustrating a converter pouring process that is performed in the converter pouring area 3 of FIG. 1. In the figure, a converter 30 is a refining furnace for further refining the molten metal 6a. The molten metal 6a inside the ladle 6 is poured into the converter 30 in the converter pouring area 3. In a case where a substantial amount of metal 6b adheres on the ladle 6, the metal 6b constitutes a dam upon pouring of the molten metal 6a inside the ladle 6 into the converter 30, so that outpouring of the molten metal 6a from the ladle 6 is accordingly hindered. A large amount of metal 6b translates into increased overall weight of the ladle 6, and thus into a greater load on the crane that hoists the ladle 6.

Figure 5:
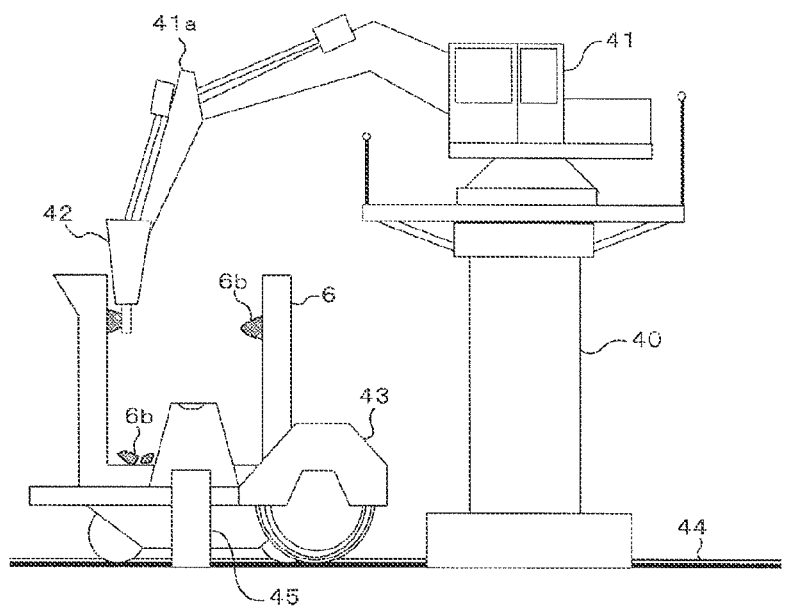
FIG. 5 is an explanatory diagram illustrating a metal drop process that is performed in a metal fall area of FIG. 1.

Next, FIG. 5 is an explanatory diagram illustrating a metal fall process that is performed in the metal fall area 4 of FIG. 1. The metal fall area 4 is an area provided between the converter pouring area 3 and the electric furnace tapping area 1, in the transport route of the ladle 6 in the steel mill. A gate-type overdeck 40 is provided in the metal fall area 4. An articulated arm device 41 is provided on the gate-type overdeck 40. A metal faller 42 is attached to the leading end of a movable arm 41a of the articulated arm device 41. For instance, a crusher or the like that hits an object with a sharp bit is used herein as the metal faller 42.

The ladle 6 out of which the molten metal 6a is poured into the converter 30 in the converter pouring area 3 described above is placed on a dolly 43, and is carried to the vicinity of the gate-type overdeck 40 along rails 44. The dolly 43 is fixed by a stopper 45 when the dolly 43 is at a position in the vicinity of the gate-type overdeck 40; thereupon, operation by an operator drives the metal faller 42, along with pivoting the movable arm 41a, and the metal 6b is fallen as a result into the ladle 6. The ladle 6 into which the metal 6b has been dropped is not herein a stand by ladle, and is returned to the electric furnace tapping area 1. In the present embodiment, thus, the molten metal 6a is poured from the ladle 6 into the converter 30, and thereafter, the metal 6b that adheres to the ladle 6 is thus dropped into the ladle 6 on-line (metal fall area 4).

Specifically, the feature wherein the metal 6b that adheres to the ladle 6 is dropped into the ladle 6 on-line denotes herein a feature wherein the metal 6b is dropped into the ladle 6 on the route along which the ladle 6 is transported from the converter 30 (refining furnace) to the electric furnace 10 (melting furnace), such that the ladle 6 is used continuously without being in a stand by state. As a result, the on-line falling of the metal 6b adhering to the ladle 6 makes it possible to avoid conveyance, into the ladle maintenance area 5 (off-line), of a ladle 6 that requires no maintenance, and to thus avoid loss of operational efficiency. Further, the ladle 6 can return, to the electric furnace tapping area 1, in a state where the ladle 6 and the metal 6b are at a high temperature, and thus the heat of the ladle 6 and the metal 6b can be utilized even more effectively. When the ladle 6 is transported to the ladle maintenance area 5, the ladle 6 and the metal 6b are cooled down to normal temperature, although in a case where the metal 6b is dropped into the ladle 6 on-line, as in the present embodiment, the temperature of the metal 6b at the time of pouring of the molten metal 6a from the electric furnace 10 into the ladle 6 ranges from about 500 to 700° C. The metal 6b adhering to the ladle 6 as a result of in-ladle stir refining characteristically has a higher proportion of valuable metals than that of a metal that adheres to the ladle 6 without undergoing in-ladle stir refining. Accordingly, the components of the molten metal 6a exhibit little turbulence even upon recovery of the metal 6b, in the form of a material, through melting by the molten metal 6a from the electric furnace 10, as illustrated in FIG. 2.

In the explanation above, the metal 6b adheres to the ladle 6 in the KR desulfurization process, but splattered molten metal 6a adheres to the ladle 6, in the form of metal 6b, also in the electric furnace tapping process and the converter pouring process. That is, the metal 6b that is dropped in the metal fall process also encompasses metal 6b that adheres to the ladle 6 during pouring of the molten metal 6a from the electric furnace 10 into the ladle 6, and during pouring of the molten metal 6a inside the ladle 6 into the converter 30.

Figure 6:
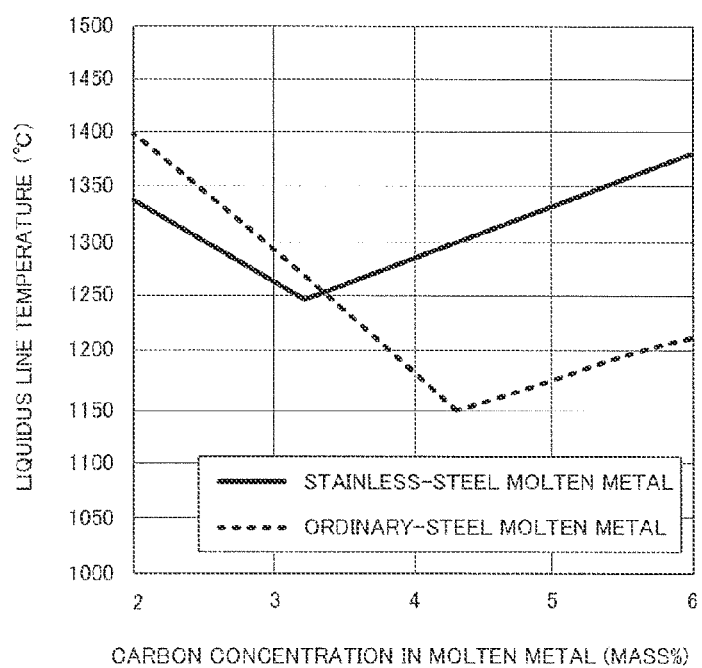
FIG. 6 is a graph illustrating liquidus line temperatures of stainless-steel molten metal and ordinary-steel molten metal.

Next, FIG. 6 is a graph illustrating liquidus line temperatures of stainless-steel molten metal and ordinary-steel molten metal. In the figure, the solid line represents a liquidus line of stainless-steel molten metal, and the dashed line represents a liquidus line of ordinary-steel molten metal.

Generally, the carbon concentration after desulfurization is set in such a manner that the temperature denoted by the liquidus line is a lower temperature. In the case of stainless steel production, specifically, the carbon concentration after desulfurization is set to range from about 1.0 mass % to 4.0 mass %, while in the case of production of ordinary steel, the carbon concentration after desulfurization is set to range from about 3.0 mass % to 5.5 mass %.

As illustrated in FIG. 6, the melting point of stainless-steel molten metal at a time where the carbon concentration after desulfurization ranges from about 1.0 mass % to 4.0 mass % is of about 1250° C., which is higher than the melting point of ordinary-steel molten metal (about 1150° C.) at a time where the carbon concentration after desulfurization ranges from about 3.0 mass % to 5.5 mass %. Upon production of stainless steel, thus, the molten metal 6a adheres to the ladle 6, in the form of metal 6b, at a temperature that is higher than when ordinary steel is produced, and, accordingly, a greater amount of metal 6b adheres to the ladle 6. In the production of stainless steel, as a result, it is necessary to remove the metal 6b at a higher frequency than is the case in the production of ordinary steel. Avoiding deterioration of operational efficiency, through on-line dropping of the metal 6b into the ladle 6, as in the method of the present embodiment, is therefore particularly advantageous in the production of stainless steel.

In such a metal recovery method, the molten metal 6a is poured from the ladle 6 into the converter 30 (refining furnace), and thereafter, the metal 6b adhering to the ladle 6 is dropped into the ladle 6 on-line, and the molten metal 6a is poured, from the electric furnace 10 (melting furnace), into the ladle 6 into which the metal 6b has been dropped. As a result, the metal 6b is melted and is recovered as a material. This therefore allows deterioration of operational efficiency to be avoided when stir refining is carried out, and allows more effective utilization of the heat of the ladle 6 and the metal 6b. In conventional methods, it has been necessary to significantly tilt the ladle 6 in order to remove the metal 6b from the ladle 6. In the method of the present embodiment, however, such an operation can be rendered unnecessary, and operational efficiency can be accordingly improved.

Herein, as the stir refining is KR desulfurization (mechanical stir refining) in which agitation is performed by the impeller 20 that is immersed in the molten metal 6a, a large amount of molten metal 6a adheres, in the form of metal 6b, to the ladle 6. Accordingly, being able to avoid a deterioration of operational efficiency through on-line dropping of the metal 6b into the ladle 6, when KR desulfurization is carried out, is extremely useful.

Further, as the molten metal 6a that is poured from the electric furnace 10 into the ladle 6 is stainless-steel molten metal, a greater amount of molten metal 6a adheres to the ladle 6, as the metal 6b, than is the case in the production of ordinary steel. Accordingly, being able to avoid a deterioration of operational efficiency through on-line dropping of the metal 6b into the ladle 6, in a case where the molten metal 6a is stainless-steel molten metal, is extremely useful.

Embodiment 2

Figure 7:
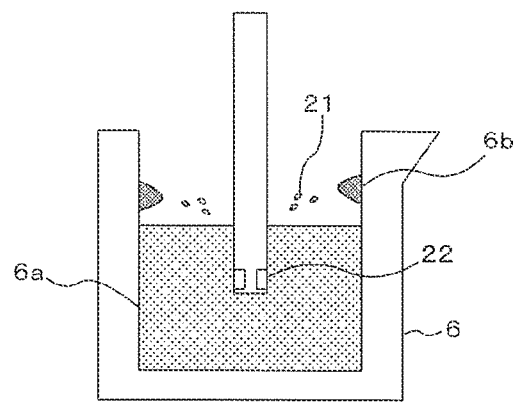
FIG. 7 is an explanatory diagram illustrating injection stir refining in a metal recovery method according to Embodiment 2 of the present invention.

FIG. 7 is an explanatory diagram illustrating injection stir refining in a metal recovery method according to Embodiment 2 of the present invention. In the explanation of Embodiment 1, KR desulfurization (mechanical stir refining) was performed as in-ladle stir refining, but injection stir refining, illustrated in FIG. 7, can also be carried out. In injection stir refining, the molten metal 6a and a desulfurizing agent are agitated through blowing of gas is into the molten metal 6a through a submerged nozzle 22 that is immersed in the molten metal 6a. Splash 21 occurs as well in such injection stir refining, and the metal 6b adheres to the ladle 6. Other features are identical to those of Embodiment 1.

Also, cases where injection stir refining is performed as in-ladle stir refining, a large amount of molten metal 6a adheres, in the form of the metal 6b, to the ladle 6, and accordingly, being able to avoid deterioration of operational efficiency, through on-line dropping of the metal 6b into the ladle 6, is extremely useful.

In the explanations of Embodiments 1 and 2, the molten metal 6a was generated in the electric furnace 10, but molten metal may also be generated in another melting furnace, for instance a blast furnace or the like.

In the explanations of Embodiments 1 and 2, the molten metal 6a was stainless-steel molten metal, but the molten metal may also be for instance, molten metal resulting from melting of ordinary steel, iron or the like.

The invention claimed is:
1. A metal recovery method for recovering, as a material, metal that adheres to a ladle, the method comprising:
   performing a series of processes in which molten metal is poured from a melting furnace into the ladle, the molten metal is subjected to stir refining inside the ladle, and the molten metal inside the ladle is poured into a refining furnace, wherein:
   after pouring a first load of molten metal from the ladle into the refining furnace, dropping a remaining metal adhering to the ladle into the ladle on-line, whereby the remaining metal adhering to the ladle becomes dropped metal received in the ladle, and
   pouring a second load of molten metal from the melting furnace into the ladle wherein the second load of molten metal is poured over the dropped metal received in the ladle, thereby melting the dropped metal and recovering the dropped metal as a material.
2. The metal recovery method according to claim 1, wherein the stir refining is mechanical stir refining in which agitation is performed by an impeller that is immersed in the molten metal, or injection stir refining in which a gas is blown into the molten metal.
3. The metal recovery method according to claim 1, wherein the molten metal that is poured from the melting furnace into the ladle is stainless-steel molten metal.
4. The metal recovery method according to claim 2, wherein the molten metal that is poured from the melting furnace into the ladle is stainless-steel molten metal.
5. The metal recovery method of claim 1, wherein the step of dropping comprises hitting the remaining metal adhering to the ladle with a bit.
6. The metal recovery method of claim 1, wherein on-line includes a metal fall area which is provided on a route where the ladle is transported from the refining furnace to the melting furnace, wherein the ladle is continuously used without being in a stand by state.

* * * * *